United States Patent
Weickert et al.

(10) Patent No.: US 10,422,480 B2
(45) Date of Patent: Sep. 24, 2019

(54) STORAGE VESSEL COMPRISING A ONE-PIECE SHAPED BODY OF A POROUS SOLID

(71) Applicant: BASF SE, Ludwigshafen (DE)

(72) Inventors: Matthias Weickert, Ludwigshafen (DE); Stefan Marx, Dirmstein (DE); Ulrich Müller, Neustadt (DE); Lena Arnold, Mannheim (DE); Adam Lack, New York, NY (US); Joseph Lynch, Sparta, NJ (US); William Dolan, Yardley, PA (US); Michael Santamaria, Monmouth Junction, NJ (US)

(73) Assignee: BASF SE, Ludwigshafen am Rhein (DE)

( * ) Notice: Subject to any disclaimer, the term of this patent is extended or adjusted under 35 U.S.C. 154(b) by 47 days.

(21) Appl. No.: 15/524,484

(22) PCT Filed: Nov. 10, 2015

(86) PCT No.: PCT/EP2015/076204
§ 371 (c)(1),
(2) Date: May 4, 2017

(87) PCT Pub. No.: WO2016/075136
PCT Pub. Date: May 19, 2016

(65) Prior Publication Data
US 2017/0336030 A1    Nov. 23, 2017

Related U.S. Application Data

(60) Provisional application No. 62/077,934, filed on Nov. 11, 2014.

(51) Int. Cl.
*F17C 1/00* (2006.01)
*F17C 11/00* (2006.01)
(Continued)

(52) U.S. Cl.
CPC ........... *F17C 11/007* (2013.01); *B01J 20/226* (2013.01); *B01J 20/2803* (2013.01);
(Continued)

(58) Field of Classification Search
CPC ..... F17C 11/007; F17C 11/002; F17C 11/005; F17C 8020/226; F17C 20/2803;
(Continued)

(56) References Cited

U.S. PATENT DOCUMENTS

| 5,648,508 A | 7/1997 | Yaghi |
| 6,929,679 B2 | 8/2005 | Müller et al. |

(Continued)

FOREIGN PATENT DOCUMENTS

| DE | 102005012087 A1 | 9/2006 |
| EP | 0102544 A2 | 3/1984 |

(Continued)

OTHER PUBLICATIONS

Chen, B., et al., "Interwoven Metal-Organic Framework on a Periodic Minimal Surface with Extra-Large Pores", Science, 2001, vol. 291, pp. 1021-1023.

(Continued)

*Primary Examiner* — J. Gregory Pickett
*Assistant Examiner* — Niki M Eloshway
(74) *Attorney, Agent, or Firm* — Drinker Biddle & Reath LLP

(57) ABSTRACT

The invention is related to a storage vessel (1) comprising a shaped body (3) of a porous solid, wherein the storage vessel (1) comprises a wall (5) with a section (7) comprising at least one inlet (9), wherein the storage vessel (1) has a central axis (11) and the central axis (11) is a longitudinal axis of the storage vessel (1) and/or perpendicular to a cross-sectional area of the at least one inlet (9), wherein the shaped body (3) covers at least 85% of an inner volume (13) of the storage vessel (1) and the shaped body (3) comprises an opening (19) in an axial direction (17), axial referring to the central axis (11) of the storage vessel (1), wherein the opening (19) extends from a first end (21) of the shaped body (3) to an opposing second end (23) of the shaped body (3) and wherein the storage vessel (1) comprises exactly one shaped body (3), which is formed in one piece. The invention is further related to a shaped body and use of the shaped body.

14 Claims, 2 Drawing Sheets

(51) Int. Cl.
  *B01J 20/22* (2006.01)
  *B01J 20/28* (2006.01)
  *B01J 20/30* (2006.01)
  *F17C 5/00* (2006.01)

(52) U.S. Cl.
  CPC ... *B01J 20/28042* (2013.01); *B01J 20/28045* (2013.01); *B01J 20/28095* (2013.01); *B01J 20/3007* (2013.01); *B01J 20/3042* (2013.01); *F17C 11/002* (2013.01); *F17C 11/005* (2013.01); *F17C 2201/0119* (2013.01); *F17C 2221/011* (2013.01); *F17C 2221/012* (2013.01); *F17C 2221/013* (2013.01); *F17C 2221/014* (2013.01); *F17C 2221/017* (2013.01); *F17C 2221/018* (2013.01); *F17C 2221/033* (2013.01); *F17C 2221/035* (2013.01); *F17C 2270/0105* (2013.01); *F17C 2270/0171* (2013.01); *F17C 2270/0178* (2013.01); *F17C 2270/0189* (2013.01); *Y02C 10/08* (2013.01); *Y02E 60/321* (2013.01)

(58) Field of Classification Search
  CPC .......... F17C 20/28042; F17C 20/28045; F17C 20/28095; F17C 20/3007; F17C 20/3042; F17C 2201/0119; B01J 20/226; B01J 20/2803; B01J 20/28042; B01J 20/28045; B01J 20/28095; B01J 20/3007; B01J 20/3042; Y02C 10/08; Y02E 60/321
  USPC .................................................. 220/581, 586
  See application file for complete search history.

(56) References Cited

U.S. PATENT DOCUMENTS

| | | | |
|---|---|---|---|
| 7,534,303 | B2 | 5/2009 | Mueller et al. |
| 8,100,151 | B2 | 1/2012 | Handa |
| 8,163,949 | B2 | 4/2012 | Mueller et al. |
| 9,452,380 | B2 * | 9/2016 | Hornbostel ............ F17C 11/005 |
| 2009/0031855 | A1 * | 2/2009 | Ramberg ............... B01D 53/02 75/330 |
| 2009/0229555 | A1 | 9/2009 | Ginzburg et al. |
| 2010/0212495 | A1 * | 8/2010 | Gadkaree ............... B01D 53/02 95/139 |
| 2011/0107914 | A1 * | 5/2011 | Su .......................... B01D 53/02 96/130 |
| 2013/0068101 | A1 * | 3/2013 | Knapp ................... B01J 20/3007 96/108 |
| 2013/0207034 | A1 * | 8/2013 | Addiego ............. B01J 20/28045 252/184 |
| 2015/0174520 | A1 * | 6/2015 | Monereau .......... B01J 20/28033 96/154 |
| 2015/0343418 | A1 * | 12/2015 | Johnson .................... C07C 7/12 210/660 |
| 2017/0259190 | A1 * | 9/2017 | Parmentier ............ B01D 15/22 |
| 2018/0099878 | A1 * | 4/2018 | Levy ....................... C02F 1/283 |
| 2018/0178194 | A1 * | 6/2018 | Hasumi .................. B01J 20/06 |
| 2018/0207611 | A1 * | 7/2018 | Byrne .................... B01D 53/04 |

FOREIGN PATENT DOCUMENTS

| | | |
|---|---|---|
| EP | 0200260 A2 | 12/1986 |
| EP | 0389041 A1 | 9/1990 |
| EP | 0592050 A1 | 4/1994 |
| EP | 0709253 A1 | 5/1996 |
| EP | 1406716 A1 | 4/2004 |
| JP | H03037156 A | 2/1991 |
| WO | WO-9413584-1 | 6/1994 |
| WO | WO-9429408 A1 | 12/1994 |
| WO | WO-9519222 A1 | 7/1995 |
| WO | WO-03008068 A1 | 1/2003 |
| WO | WO-2003064030 A1 | 8/2003 |
| WO | WO-03102000 A1 | 12/2003 |
| WO | WO-2005003622 A1 | 1/2005 |
| WO | WO-2005049484 A1 | 6/2005 |
| WO | WO-2006089908 A1 | 8/2006 |
| WO | WO-2014057416 A1 | 4/2014 |
| WO | WO-2014059392 A1 | 4/2014 |
| WO | WO-2015054332 A1 | 4/2015 |

OTHER PUBLICATIONS

Eddaoudi, M., et al., "Design and synthesis of metal-carboxylate frameworks with permanent microporosity", Topics in Catalysis, 1999, vol. 9, pp. 105-111.

Li, H., et al., "Design and synthesis of an exceptionally stable and highly porous metal-organic framework", Nature, 1999, vol. 402, pp. 276-279.

O'Keeffe, M., et al., "Frameworks for Extended Solids: Geometrical Design Principles", Journal of Solid State Chemistry, 2000, vol. 152, pp. 3-20.

Peng, Y., et al., "Methane Storage in Metal-Organic Frameworks: Current Records, Surprise Findings, and Challenges", Journal of the American Chemical Society, 2013, vol. 135, No. 32, pp. 11887-11894.

Sing, K., et al., "Reporting Physisorption Data for Gas Solid Systems", Pure & Appl. Chem., 1985, vol. 57, pp. 603-619.

Ullmann's Enzylopädie der Technischen Chemie, 4th Edition, vol. 2, p. 313 et seq., 1972. (Only Available in German).

International Prelminary Examination Report for PCT/EP2015/076204 dated Feb. 27, 2017.

Written Opinion of the International Searching Authority for PCT/EP2015/076204 dated Feb. 4, 2016.

* cited by examiner

STORAGE VESSEL COMPRISING A ONE-PIECE SHAPED BODY OF A POROUS SOLID

CROSS-REFERENCE TO RELATED APPLICATIONS

This application is a national stage application (under 35 U.S.C. § 371) of PCT/EP2015/076204, filed Nov. 10, 2015, which claims benefit of U.S. Application No. 62/077,934, filed Nov. 11, 2014, both of which are incorporated herein by reference in their entirety.

The invention relates to a storage vessel comprising a shaped body of a porous solid. It further relates to a shaped body and use of the shaped body.

Owing to the increasing scarcity of oil resources, research is increasingly being made to unconventional fuels such as methane, ethanol or hydrogen for operating an internal combustion engine or a fuel cell. For this purpose, vehicles comprise a storage vessel for keeping a stock of the fuel. For the storage of gas in stationary and mobile applications, the gas is stored in pressure vessels, often referred to as compressed natural gas (CNG) technique or in sorption stores, often referred to as adsorbed natural gas (ANG) technique. Sorption stores are also known as ANG tanks. ANG has the potential to replace compressed natural gas CNG in mobile storage applications such as in vehicles. In ANG-applications a porous solid is packed in a storage vessel to increase the storage density, enabling lower pressure operation with the same capacity.

Sorption, covering adsorption and absorption, is an exothermic process. Any sorption or desorption is accompanied by a temperature change in an ANG-storage system. The heat of sorption has a detrimental effect on performance during both filling cycles and discharge cycles. A temperature increase as high as 80° C. can occur during the filling cycle. A filling cycle normally will be performed at a fuel station, at least for mobile applications, where the released sorption heat can be removed. Contrary to the filling cycle, the rate of discharge is dictated by the energy demand for desorption. The filling time cannot be widely varied to moderate the impact of cooling during the use of ANG storage vessels.

Such storage vessels comprise in particular sorbent media having a large internal surface area on which the gas is adsorbed. The gas is stored by adsorption on the adsorbent medium, in the cavities between an individual particle of the adsorbent medium and in parts of the vessel, which are not filled with adsorbent medium. Alternatively or additionally the gas can be absorbed by the sorption medium. The filled storage vessel can be pressurized and non-pressurized. Selection of a suitable vessel depends on the applied maximum pressure. The higher the storage pressure the more gas can be stored per volume.

Adsorption describes the attachment of atoms or molecules of a gaseous or liquid fluid onto the surface of a solid material, which is also referred to as adsorbent medium, adsorbent, adsorber, absorber or sorption medium. The sorption capacity of the solid, defined by the ratio of the mass of the sorbed gas or liquid to the mass of the solid, strongly depends on temperature and is reduced with increasing temperature. In the aim of a maximal exploitation of the storage space, the temperature profile established in the storage vessel during the filling procedure has to be taken into consideration. An efficient sorption allows a reduced filling time as the same amount of gas can be stored in a shorter time period. Hence, the maximum amount of stored gas can be increased when the available filling time is limited. During filling the storage vessel with gas two sources are relevant for a temperature increase in the vessel. These are the heat due to compression of the gas and the heat liberated as a result of the exothermic sorption. The amount of generated heat directly depends on the amount of sorbed gas. The more gas is sorbed on the sorbent medium, the more heat is liberated. And with increasing sorbed amount of gas on the solid, the sorption rate, defined as amount of gas sorbed per unit of time, is reduced.

In turn, desorption is an endothermic process and heat has to be supplied when gas is taken from the storage vessel. Heat management is therefore of great importance when storage vessels with sorbent medium are used.

Due to their large surface areas, in particular metal-organic framework materials (MOFs) are of interest for applications in gas storage. Advantageously, pulverulent materials are processed to compact shaped bodies. These can be handled more conveniently and especially in a safer manner. Shaped bodies allow better exploitation of volumes available in apparatuses or vessels and reduce pressure drops. Prerequisite for a successful use for shaped bodies are preliminarily a high sorption capacity, adequate thermal and mechanical stability and high abrasion resistance.

US 2009/0229555 A1 discloses a storage system for an absorbing gas including a plurality of briquette units in a storage tank. Each briquette can include a liner or open vessel, which are associated with compressed gas-absorbing particulate matter. This storage system provides a mechanism for supplying or removing heat. The heat transfer mechanism comprises channels for transporting gas and/or fluid. These channels can pass through a briquette unit.

U.S. Pat. No. 8,100,151 B2 describes gas absorbent media, which are provided in a predetermined length of polygon or curvilinear shape. Additionally, a heat absorbent medium is provided, which allows an improved heat transfer from the absorbent to the outside of the tank during filling. Hexagonal tubes are installed along the radial or the longitudinal axis of a fuel tank. Tubes having a gas sorbent medium therein are installed in a predetermined interrelationship with adjacent spaces, for example also tubes, of similar shape, wherein the adjacent spaces are open or filled with the heat absorbent medium. The open spaces are provided to allow gas circulation within the entire interior volume of the tank, which is occupied by a honeycomb assembly. A central heat exchanger is shown in the interior of the tank. Assemblies of sorbent and spacer tubes, which are open or filled with the heat sorbent medium, may be formed into a plurality of disks.

Peng et al., Journal of the American Chemical Society (2013), 135 (32), pages 11887 to 11894, disclose metal-organic framework materials, which are compacted into wafer shapes in order to increase packing density.

Storage vessels and shaped bodies known from the state of the art are not sufficiently optimized for a maximum storage capacity and an efficient heat transfer in the interior of the storage vessel. In cases the heat transfer is addressed, a large portion of the inner volume of the storage vessel is occupied by the further equipment, as for example heat exchangers, which causes additional weight and energy consumption as well as higher construction costs.

It is an object of the invention to provide a storage vessel and a shaped body, which enable maximum storage capacities, reasonable heat transfer properties and therefore effective filling processes. Further, effort required for production of the shaped body and the storage vessel as well as for the assembly of the shaped body in the storage vessel should be reduced.

This object is achieved by a storage vessel comprising a shaped body of a porous solid, wherein the storage vessel comprises a wall with a section comprising at least one inlet, wherein the storage vessel has a central axis and the central axis is a longitudinal axis of the storage vessel and/or perpendicular to a cross-sectional area of the at least one inlet, wherein the shaped body covers at least 85%, preferably at least 90%, more preferably at least 93% and most preferably at least 95% of an inner volume of the storage vessel and the shaped body comprises an opening in an axial direction, axial referring to the central axis of the storage vessel, wherein the opening extends from a first end of the shaped body to an opposing second end of the shaped body and wherein the storage vessel comprises exactly one shaped body, which is formed in one piece.

By means of the invention, the inner volume of the storage vessel is exploited to a maximum for the provision of the porous solid in order to store a maximum amount of gas but still a required gas flow in the storage vessel is possible. The production and arrangement of the shaped body is simplified.

The size of the shaped body corresponds to the dimensions of the storage vessel. The shaped body is completely traversed by the opening, which is situated preferably in prolongation of the at least one inlet of the storage vessel. Thus, gas entering the storage vessel and reaching the shaped body can further be conducted into the storage vessel and the shaped body from the first end of the shaped body to the opposing second end of the shaped body.

The shaped body, which can also be referred to as monolith, is made of the porous solid in one piece. The form of the shaped body is constituted only from the porous solid and preferably no further container, shell, cover or envelope is required in the storage vessel to gather the porous material. Typically, the porous solid in a pulverulent form is pressed into the form of the shaped body.

In the context of the invention, the inner volume of the storage vessel is meant to be the volume, which is enclosed by the wall of the storage vessel. When the proportion of the inner volume covered by the shaped body is higher, more porous solid can be provided in the storage vessel for the sorption of gas.

The storage vessel according to the invention is provided to store a gas, which is preferably usable as fuel. The gas is fed into the storage vessel through the at least one inlet. The gas inside the storage vessel is compressed and absorbed onto or absorbed into the porous solid during filling. Compression and sorption generate heat and thus the gas, the storage vessel and the shaped body heat up. The temperature distribution in the storage vessel depends on the flow conditions and heat transfer conditions in and around the shaped body.

In a preferred embodiment, the shaped body comprises hollow channels in the axial direction and a cross-sectional area of each hollow channel is smaller than a cross-sectional area of the opening. An inner diameter of the hollow channels is preferably in a range from 0.5 mm to 3 mm. Preferably, a sum of the cross-sectional areas of all hollow channels is less than 20%, more preferably less than 10% and most preferably less than 5% smaller or greater than the cross-sectional area of the at least one inlet for a reasonable pressure drop during the filling process. A shortest distance between two circumferences of the cross-sectional areas of adjacent hollow channels is less than 2 cm, more preferably in a range from 0.8 to 1.2 cm and most preferably 1 cm. The hollow channels can be distributed homogeneously in an equal distance to each other over the shaped body. Generally every pattern is possible as for example concentric circles.

By means of the hollow channels, a more homogeneous distribution of flow conditions and heat transfer as well as temperature can be achieved in the storage vessel.

Depending on the installation space available and the maximum permissible pressure in the storage vessel, different cross-sectional areas are suitable for the storage vessel, for example circular, elliptical or rectangular. Irregularly shaped cross-sectional areas are also possible, e.g. when the vessel is to be fitted into a hollow space of a vehicle body. For high pressures above about 100 bar, circular and elliptical cross sections are particularly suitable. The storage vessel size varies according to the application. Diameters of the storage vessel of approximately 50 cm are typical for tanks in trucks and approximately 20 cm for tanks in cars, respectively. In cars fill volumes between 20 L and 40 L are provided, whereas tanks of a volume between 500 L and 3000 L can be found in trucks. Typically, a diameter of the at least one inlet is smaller than the diameter of the vessel by a factor of 5 to 10. Preferably the diameter of inlet is smaller than 50 cm, often the diameter of the mouth of the storage vessel has a standardized size as usually applied in tanks for vehicles.

The shaped body has a shortest extension and a longest extension, wherein the shortest extension is smaller than the longest extension. In a preferred embodiment, a shortest extension of the shaped body is in a range from 10 cm to 100 cm and a longest extension of the shaped body is in the range from 20 cm to 300 cm. In one further preferred embodiment, applicable for example for cars, the longest extension of the shaped body is in the range from 20 cm to 120 cm, more preferably from 70 cm to 90 cm, and the shortest extension of the shaped body is in a range from 10 cm to 60 cm, more preferably from 30 cm to 50 cm. In another further preferred embodiment, applicable for example for trucks, the longest extension of the shaped body is in the range from 100 cm to 300 cm, more preferably from 150 cm to 200 cm and the shortest extension of the shaped body is in a range from 30 cm to 100 cm, more preferably from 40 cm to 60 cm.

In a further preferred embodiment, the storage vessel has a cylindrical shape and also the shaped body has the form of a cylinder. Preferably, in a cross-sectional view, the form of a circumference of the storage vessel corresponds to the form of a circumference of the shaped body.

Preferably, the storage vessel is a pressure vessel for the storage of gas at a pressure in the range up to 500 bar, preferably in a range of 1 bar to 400 bar, most preferably in a range of 1 bar to 250 bar. For some applications, a range of 1 bar to 100 bar is most preferred.

In a further preferred embodiment, the storage vessel comprises at least one outlet and the at least one inlet and the at least one outlet are both provided in the same section of the wall of the storage vessel. Thus, the at least one inlet and the at least one outlet can be located in the same position and combined in one constructional part or adapter. The close arrangement of the at least one inlet and the at least one outlet is especially advantageous in order to establish a flow-through regime during filling, which is further described in WO 2014/057416. For a flow-through regime during filling a flow-through is established in the interior of the storage tank during filling and a gas flow through the gas outlet out of the storage vessel exceeds 0 kg/h preferably 50 kg/h and more preferably 100 kg/h during filling.

The storage vessel, especially the wall of the storage vessel, can be made from any material as for example metal, steel, fabric, fiber, plastic or composite material. Fiber composite material and steel are preferred. The wall of the storage vessel can be configured as a double wall comprising a heat exchanger medium for heat transfer.

Preferably, a diameter of the opening in the shaped body is in a range from 5 mm to 7 mm, for example 6 mm, for a gas mass flow of 300 kg/h during filling. The preferred diameter varies with the root square of the mass flow. Preferably, a longest diameter of the opening is in a range from 0.2% to 20% of the longest diameter of the radial cross-sectional area of the storage vessel. In a further preferred embodiment, the opening in the shaped body is arranged centrally with respect to the storage vessel and/or in line with the at least one inlet.

In an embodiment, the outer dimensions of the shaped body in the radial direction correspond to the dimensions of the wall of the storage vessel and the circumference of the shaped body is in intimate contact with the wall of the storage vessel.

In a preferred embodiment, a first void space, which is free of the shaped body, is provided between the wall of the storage vessel and an end face of the shaped body, which faces in the axial direction and which faces away from the at least one inlet, and wherein the first void space comprises up to 15% of the inner volume of the storage vessel.

In the first void space incoming gas can be collected after being conducted through the opening. In case the storage vessel also comprises an outlet, which is also open during filling, part of the gas can flow from the first void space back through pores of the shaped body or through the hollow channels towards the outlet.

In a further preferred embodiment, at least one first spacer is provided next to or on the end face of the shaped body. In the latter case the at least one first spacer is preferably provided on the inner wall of the storage vessel. In this embodiment, the wall facing to the interior of the storage vessel is not even, but providing several convexities, which are in contact with and holding the shaped body.

In a further preferred embodiment, at least three first spacers are provided, more preferably four first spacers are provided. The more first spacers are provided, the better a tilting of the shaped body towards the wall of the storage vessel can be avoided.

A distance between the end face of the shaped body and the wall of the storage vessel can be adjusted by a height of the at least one first spacer, which is preferably in a range from 0.1 cm to 2 cm, more preferably from 0.3 to 1 cm.

In a further preferred embodiment, a second void space, which is free of the shaped body, is provided between the wall of the storage vessel and a peripheral surface of the shaped body, wherein the peripheral surface faces in a radial direction, radial referring to the central axis, and wherein the second void space comprises up to 10% of the inner volume of the storage vessel.

As within the first void space, also within the second void space, the gas can flow without considerable hindrance. Thus, the heat transfer in the storage vessel is improved. This is particularly important for the heat transfer from the center of the storage vessel to the wall of the storage vessel, at which heat can be transferred more easily from or to the environment, for example by means of a double jacket.

In a further preferred embodiment, at least one second spacer is provided next to or on the peripheral surface of the shaped body. Preferably, the shaped body comprises at least three second spacers, more preferably four second spacers in order to generate a slot with a constant width between the shaped body and the wall of the storage vessel. The at least one second spacer is provided only on several points of the peripheral surface and is not covering the complete circumference of the shaped body in order to ensure the slot being provided between the shaped body and the wall. Through this slot gas can flow without particular flow resistance. The presence of the second spacer is especially advantageous in case of a filling process according to WO 2014/057416. Particularly when the filling process with established flow-through is applied, a gas stream can flow through the slot from the at least one inlet to a closed end of the storage vessel and further from the closed end to the at least one outlet. In the scope of the invention the closed end can be located at the side or at the bottom in relation to the rest of the storage vessel, as the storage vessel can be mounted horizontally or vertically. A horizontal position is preferred.

Instead of at least one second spacer, the circumference of the shaped body can have an irregular shape due to which contact areas between the peripheral surface of the shaped body with the wall and slots alternate.

In the scope of the invention the term "spacer" on the one hand covers parts, which are attached additionally to the shaped body or to the wall of the storage vessel and which are made of a material other than the shaped body or the wall of the storage vessel. On the other hand convexities of the shaped body or the wall of the storage vessel are covered. In the latter case, the spacers are made of the same material as the shaped body or the storage vessel wall, respectively, and they are formed continuously in one piece with the shaped body or the wall of the storage vessel, respectively. The spacers can be formed in one process step simultaneously with the pressing of the shaped body. In a preferred embodiment, the at least one first spacers and/or and the at least one second spacers are formed in one piece with the shaped body.

In a further preferred embodiment, the porous solid is selected from the group consisting of activated charcoal, zeolites, activated aluminia, silica gels, open-pore polymer foams, metal hydrides, metal-organic frameworks (MOF) and combinations thereof.

Metal-organic frameworks usually comprise an at least bidentate organic compound, which is coordinated to a metal component and together with the metal component forms the skeleton of the metal-organic framework. The metal-organic framework materials as such are described, for example, in U.S. Pat. No. 5,648,508, EP-A-0 709 253, M. O'Keeffe et al., J. Sol. State Chem., 152 (2000), pages 3-20, H. Li et al., Nature 402 (1999), pages 276 seq., M. Eddaoudi et al. Topics in Catalysis 9 (1999), pages 105-111, B. Chen et al., Science 291 (2001), pages 1021-1023.

The metal component in the framework according to the present invention is preferably selected from groups Ia, IIa, IIIa, IVa to VIIIa and Ib to VIb of the periodic table. Particular preference is given to Mg, Ca, Sr, Ba, Sc, Y, Ln, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, Al, Ga, In, Tl, Si, Ge, Sn, Pb, As, Sb and Bi, where Ln represents lanthanides.

Lanthanides are La, Ce, Pr, Nd, Pm, Sm, En, Gd, Tb, Dy, Ho, Er, Tm, Yb.

As regards the ions of these elements, particular mention may be made of $Mg^{2+}$, $Ca^{2+}$, $Sr^{2+}$, $Ba^{2+}$, $Sc^{3+}$, $Y^{3+}$, $Ln^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh+$, $Ir^{2+}$, $Ni^{2+}$, $Ni+$, $Pd^{2+}$, $Pd+$, $Pt^{2+}$, $Pt+$, $Cu^{2+}$, $Cu+$, $Ag+$, $Au+$, $Zn^{2+}$, $Cd^{2+}$, $Hg^{2+}$, $Al^{3+}$, $Ga^{3+}$, $In^{3+}$, $Tl^{3+}$, $Si^{4+}$, $Sl^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb+$, $Bi^{5+}$, $Bi^{3+}$ and $Bi^{+}$.

Very particular preference is given to Mg, Ca, Al, Y, Sc, Zr, Ti, V, Cr, Mo, Fe, Co, Cu, Ni, Zn, Ln. Greater preference is given to Mg, Zr, Ni, Al, Mo, Y, Sc, Mg, Fe, Cu and Zn. In particular, Mg, Fe, Zr, Sc, Al, Cu and Zn are preferred. Very particular mention may here be made of Mg, Zr, Al, Cu and Zn.

The term "at least bidentate organic compound" refers to an organic compound which comprises at least one functional group which is able to form at least two coordinate bonds to a given metal ion and/or to form one coordinate bond to each of two or more, preferably two, metal atoms.

As functional groups via which the abovementioned coordinate bonds are formed, particular mention may be made by way of example of the following functional groups: —$CO_2H$, —$CS_2H$, —$NO_2$, —$B(OH)_2$, —$SO_3H$, —$Si(OH)_3$, —$Ge(OH)_3$, —$Sn(OH)_3$, —$Si(SH)_4$, —$Ge(SH)_4$, —$Sn(SH)_3$, —$PO_3H$, —$AsO_3H$, —$AsO_4H$, —$P(SH)_3$, —$As(SH)_3$, —$CH(RSH)_2$, —$C(RSH)_3$—CH $(RNH_2)_2$—$C(RNH_2)_3$, —$CH(ROH)_2$, $C(ROH)_3$, —CH $(RCN)_2$, —$C(RCN)_3$, where R is, for example, preferably an alkylene group having 1, 2, 3, 4 or 5 carbon atoms, for example a methylene, ethylene, n-propylene, i-propylene, n-butylene, i-butylene, tert-butylene or n-pentylene group, or an aryl group comprising 1 or 2 aromatic rings, for example 2 $C_6$ rings, which may optionally be fused and may, independently of one another, be appropriately substituted by at least one substituent in each case and/or may, independently of one another, in each case comprise at least one heteroatom such as N, O and/or S. In likewise preferred embodiments, mention may be made of functional groups in which the abovementioned radical R is not present. In this respect, mention may be made of, inter alia, —$CH(SH)_2$, —$C(SH)_3$, —$CH(NH_2)_2$, —$C(NH_2)_3$, —$CH(OH)_2$, —$C(OH)_3$, —$CH(CN)_2$ or —$C(CN)_3$.

However, the functional groups can also be heteroatoms of a heterocycle. Particularly nitrogen atoms may here be mentioned.

The at least two functional groups can in principle be bound to any suitable organic compound as long as it is ensured that the organic compound bearing these functional groups is capable of forming the coordinate bond and of producing the framework.

The organic compounds comprising the at least two functional groups are preferably derived from a saturated or unsaturated aliphatic compound or an aromatic compound or a both aliphatic and aromatic compound.

The aliphatic compound or the aliphatic part of the both aliphatic and aromatic compound can be linear and/or branched and/or cyclic, with a plurality of rings per compound also being possible. The aliphatic compound or the aliphatic part of the both aliphatic and aromatic compound more preferably comprises from 1 to 15, more preferably from 1 to 14, more preferably from 1 to 13, more preferably from 1 to 12, more preferably from 1 to 11 and particularly preferably from 1 to 10, carbon atoms, for example 1, 2, 3, 4, 5, 6, 7, 8, 9 or 10 carbon atoms. Particular preference is here given to, inter alia, methane, adamantane, acetylene, ethylene or butadiene.

The aromatic compound or the aromatic part of the both aromatic and aliphatic compound can have one or more rings, for example two, three, four or five rings, with the rings being able to be present separately from one another and/or at least two rings being able to be present in fused form. The aromatic compound or the aromatic part of the both aliphatic and aromatic compound particularly preferably has one, two or three rings, with one or two rings being particularly preferred. Furthermore, each ring of said compound can independently comprise at least one heteroatom, for example N, O, S, B, P, Si, Al, preferably N, O and/or S. The aromatic compound or the aromatic part of the both aromatic and aliphatic compound more preferably comprises one or two $C_6$ rings, with the two being present either separately from one another or in fused form. In particular, mention may be made of benzene, naphthalene and/or biphenyl and/or bipyridyl and/or pyridyl as aromatic compounds.

The at least bidentate organic compound is more preferably an aliphatic or aromatic, acyclic or cyclic hydrocarbon which has from 1 to 18, preferably from 1 to 10 and in particular 6, carbon atoms and additionally has exclusively 2, 3 or 4 carboxyl groups as functional groups.

The at least one at least bidentate organic compound is preferably derived from a dicarboxylic, tricarboxylic or tetracarboxylic acid.

For example, the at least bidentate organic compound is derived from a dicarboxylic acid such as oxalic acid, succinic acid, tartaric acid, 1,4-butanedicarboxylic acid, 1,4-butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octanedicarboxylic acid, pentane-3,3-dicarboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyldicarboxylic acid, 7-chloro-8-methylquinoline-2,3-dicarboxylic acid, 1-anilinoanthraquinone-2,4'-dicarboxylic acid, polytetrahydrofuran 250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidene-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diamino(diphenyl ether)diimidedicarboxylic acid, 4,4'-diaminodiphenylmethanediimidedicarboxylic acid, 4,4'-diamino(diphenyl sulfone) diimidedicarboxylic acid, 1,4-naphthalenedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenedicarboxylic acid, 8-sulfo-2,3-naphthalenedicarboxylic acid, anthracene-2,3-dicarboxylic acid, 2',3'-diphenyl-p-terphenyl-4,4''-dicarboxylic acid, (diphenyl ether)-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinoline-dicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptanedicarboxylic acid, 5-hydroxy-1,3-benzenedicarboxylic acid, 2,5-dihydroxy-1,4-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorbenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid 1,14-tetradecanedicarboxylic acid, 5,6-dehydronorbornane-2,3-dicarboxylic acid, 5-ethyl-2,3-pyridinedicarboxylic acid or camphordicarboxylic acid.

Furthermore, the at least bidentate organic compound is more preferably one of the dicarboxylic acids mentioned by way of example above as such.

The at least bidentate organic compound can, for example, be derived from a tricarboxylic acid such as 2-hydroxy-1,2,3-propanetricarboxylic acid, 7-chloro-2,3,8-quinolinetricarboxylic acid, 1,2,3-, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid.

Furthermore, the at least bidentate organic compound is more preferably one of the tricarboxylic acids mentioned by way of example above as such.

Examples of an at least bidentate organic compound derived from a tetracarboxylic acid are 1,1-dioxidoperylo[1,12-BCD]thiophene-3,4,9,10-tetracarboxylic acid, perylenetetracarboxylic acids such as perylene-3,4,9,10-tetracarboxylic acid or (perylene-1,12-sulfone)-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

Furthermore, the at least bidentate organic compound is more preferably one of the tetracarboxylic acids mentioned by way of example above as such.

Preferred heterocycles as at least bidentate organic compound in which a coordinate bond is formed via the ring heteroatoms are the following substituted or unsubstituted ring systems:

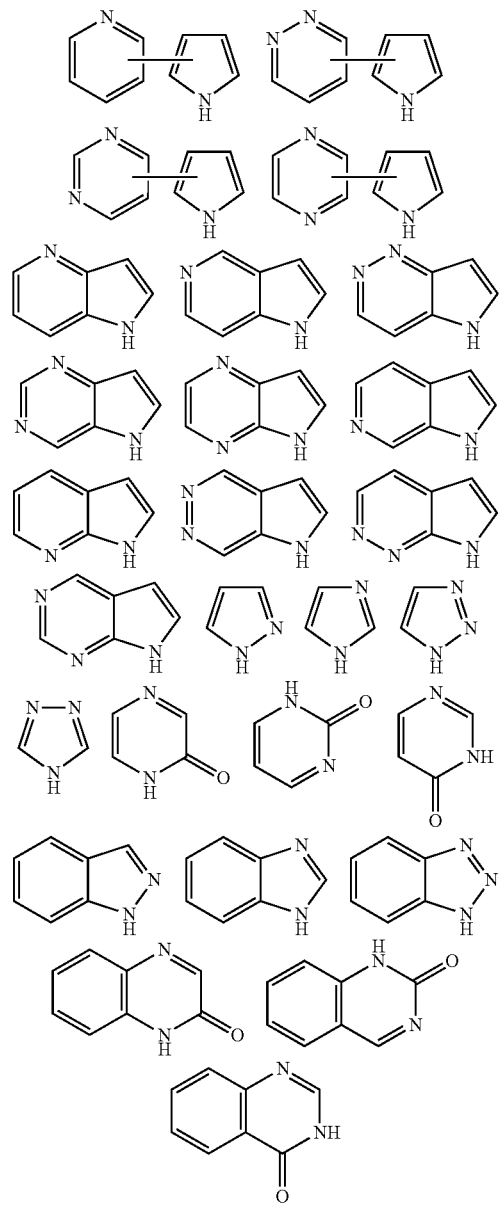

Very particular preference is given to using optionally at least monosubstituted aromatic dicarboxylic, tricarboxylic or tetracarboxylic acids which can have one, two, three, four or more rings, with each of the rings being able to comprise at least one heteroatom and two or more rings being able to comprise identical or different heteroatoms. For example preference is given to one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P, and preferred heteroatoms are N, S and/or O. Suitable substituents here are, inter alia, —OH, a nitro group, an amino group or an alkyl or alkoxy group.

Particularly preferred at least bidentate organic compounds are imidazolates such as 2-methylimidazolate, acetylenedicarboxylic acid (ADC), camphordicarboxylic acid, fumaric acid, succinic acid, benzenedicarboxylic acids such as phthalic acid, isophthalic acid, terephthalic acid (BDC), aminoterephthalic acid, triethylenediamine (TEDA), methyiglycinediacetic acid (MGDA), naphthalenedicarboxylic acids (NDC), biphenyldicarboxylic acids such as 4,4'-biphenyldicarboxylic acid (BPDC), pyrazinedicarboxylic acids such as 2,5-pyrazinedicarboxylic acid, bipyridinedicarboxylic acids such as 2,2'-bipyridinedicarboxylic acids such as 2,2'-bipyridine-5,5'-dicarboxylic acid, benzenetricarboxylic acids such as 1,2,3-, 1,2,4-benzenetricarboxylic acid or 1,3,5-benzenetricarboxylic acid (BTC), benzenetetracarboxylic acid, adamantanetetracarboxylic acid (ATC), adamantanedibenzoate (ADB), benzenetribenzoate (BTB), methanetetrabenzoate (MTB), adamantanetetrabenzoate or dihydroxyterephthalic acids such as 2,5-dihydroxyterephthalic acid (DHBDC), tetrahydropyrene-2,7-dicarboxylic acid (HPDC), biphenyltetracarboxylic acid (BPTC), 1,3-bis(4-pyridyl)propane (BPP).

Very particular preference is given to using, inter alia, 2-methylimidazole, 2-ethylimidazole, phthalic acid, isophthalic acid, terephthalic acid, 2,6-naphthalenedicarboxylic acid, 1,4-naphthalenedicarboxylic acid, 1,5-naphthalenedicarboxylic acid, 1,2,3-benzenetricarboxylic acid, 1,2,4-benzenetricarboxylic acid, 1,3,5-benzenetricarboxylic acid, 1,2,4,5-benzenetetracarboxylic acid, aminoBDC, TEDA, fumaric acid, biphenyldicarboxylate, 1,5- and 2,6-naphthalenedicarboxylic acid, tert-butylisophthalic acid, dihydroxybenzoic acid, BTB, HPDC, BPTC, BPP, fumaric acid.

Apart from these at least bidentate organic compounds, the metal-organic framework can also comprise one or more monodentate ligands and/or one or more at least bidentate ligands which are not derived from a dicarboxylic, tricarboxylic or tetracarboxylic acid.

For the purposes of the present invention, the term "derived" means that the at least one at least bidentate organic compound is present in partially or fully deprotonated form. Furthermore, the term "derived" means that the at least one at least bidentate organic compound can have further substituents. Thus, a dicarboxylic or polycarboxylic acid can have not only the carboxylic acid function but also one or more independent substituents such as amino, hydroxyl, methoxy, halogen or methyl groups. Preference is given to no further substituent being present. For the purposes of the present invention, the term "derived" also means that the carboxylic acid function can be present as a sulfur analogue. Sulfur analogues are —C(=O)SH and its tautomer and —C(S)SH.

Even more preferably, the at least one at least bidentate organic compound is selected from the group consisting of fumaric acid (FUM), terephthalic acid (BDC), benzene tricarboxylate (BTC, also known as trimesic acid), 2-methylimidazole and benzene tribenzoate (BTB) and/or the at least one metal ion is an ion selected from the group of metals consisting of Mg, Zr, Zn, Cu and Al (more preferably Zn, Cu and Al).

The term "and/or" combining two options means the first option or the second option or both, the first and the second option.

Examples of suitable metal-organic framework materials are copper-1,3,5-BTC, aluminum fumarate, zinc benzene tribenzoate and zinc 2-methylimidazolate.

The pore sizes of the metal-organic framework can be adjusted by selecting suitable organic ligands and/or bidendate compounds, also called linkers. Generally, the larger the linker is, the larger the pore size. Any pore size that is still supported by a metal-organic framework in the absence of a host and at temperatures of at least 200+ C. is conceivable. Pore sizes ranging from 0.2 nm to 30 nm are preferred, with pore sizes ranging from 0.3 nm to 3 nm being particularly preferred.

Metal organic framework comprises pores, in particular micropores or mesopores. Micropores are defined as pores having a diameter of 2 nm or less and mesopores are defined by a diameter in the range from 2 to 50 nm (Pure & Appl. Chem. 57 (1985) 603-619). The presence of micropores and/or mesopores can be checked by means of sorption measurements which determine the uptake capacity of the metal organic frameworks for nitrogen at 77 Kelvin in accordance with DIN 66134:1998-2.

WO-A 2003/102000 describes in general terms the conversion of metal-organic framework powder into shaped bodies like pellets with a resistance to pressure in the range from 2 to 100 N. In an example pellets which have a resistance to pressure of 10 N are made by means of eccentric press.

To form shaped bodies several routes exist, among them molding the pulverulent material alone or in combination with a binder and/or other components into a shaped body, for example by pelletizing. In the context of the present invention, the term "molding" refers to any process known to the expert in the field by which a porous material, i.e. any powder, powdery substance, array of crystallites etc., can be formed into a shaped body that is stable under the conditions of its intended use.

While the step of molding into a shaped body is mandatory, the following steps are optional. The molding may be preceded by a step of mixing. The molding may be preceded by a step of preparing a paste-like mass or a fluid containing the porous material, for example by adding solvents, binders or other additional substances. The molding may be followed by a step of finishing, in particular a step of drying.

The step of molding, shaping or forming may be achieved by any method known to a person skilled in the art to achieve agglomeration of a powder, a suspension or a paste-like mass. Such methods are described, for example, in Ullmann's Enzylopädie der Technischen Chemie, 4th Edition, Vol. 2, p. 313 et seq., 1972, whose respective content is incorporated into the present application by reference.

In general, the following main pathways can be discerned: briquetting or tableting, i.e. mechanical pressing of the powdery material, with or without binders and/or other additives, granulating (pelletizing), i.e. compacting of moistened powdery materials by subjecting it to rotating movements, and sintering, i.e. subjecting the material to be compacted to a thermal treatment. The latter is limited for the material according to the invention due to the limited temperature stability of the organic materials.

Specifically, the molding step according to the invention is preferably performed by using at least one method selected from the following group: briquetting by piston presses, briquetting by roller pressing, binderless briquetting, briquetting with binders, pelletizing, compounding, melting, extruding, co-extruding, spinning, deposition, foaming, spray drying, coating, granulating, in particular spray granulating or granulating according to any process known within the processing of plastics or any combination of at least two of the aforementioned methods. Briquetting and/or pelletizing are in particular preferred.

A mixture comprising the porous material can be prepared in a mixer such as intensive mixers, rotary plates, marumerizers, and any other equipment known by a person skilled in the art. Preferred mixers are selected from the group consisting of intensive mixers, rotary plates, ball formers and marumerizers.

The molding can be carried out at elevated temperatures, for example in the range from room temperature to 300° C., and/or at superatmospheric pressure, for example in the range from atmospheric pressure to a few hundred bar, and/or in a protective gas atmosphere, for example in the presence of at least one noble gas, nitrogen, dry air with a relative humidity of preferably less than 45% or a mixture of two or more thereof. The shaped bodies can be formed for example in an excenter press. A compacting force is preferably between 1 kN and 3000 kN, more preferably between 1 kN and 300 kN and most preferably between 10 kN and 150 kN. For higher forces the permeability of the shaped bodies is unnecessarily reduced and for smaller forces no stable shaped bodies are obtained. The smaller the shaped body, the higher the applied force can be chosen.

Preferably, the shaped body is produced with a pressing pressure in a range from 100 bar to 1000 bar, more preferably from 400 bar to 600 bar. The applied press can comprise an upper punch for compaction or it can compact from both sides with an upper punch and a lower punch. Further, the pressing can be performed under vacuum in order to avoid damaging the porous solid.

The step of molding can be performed in the presence of binders, lubricants and/or other additional substances that stabilize the materials to be agglomerated. As to at least one optional binder, any material known to an expert to promote adhesion between the particles to be molded together can be employed. A binder, an organic viscosity-enhancing compound and/or a liquid for converting the material into a paste can be added to the pulverulent material, with the mixture being subsequently compacted.

Suitably binders, lubricants or additives are, for example, aluminum oxide or binders comprising aluminum oxide, as described, for example, in WO 94/29408, silicon dioxide, as described, for example, in EP 0 592 050 A1, mixtures of silicon dioxide and aluminum oxide, as described, for example, in WO 94/13584, clay minerals as described, for example, in JP 03-037156 A, for example montmorillonite, kaolin, bentonite, hallosite, dickite, nacrite and anauxite, alkoxysilanes as described, for example, in EP 0 102 544 B1, for example tetraalkoxysilanes such as tetramethoxysilane, tetraethoxysilane, tetrapropoxysilane, tetrabutoxysilane, or, for example, trialkoxysilanes such as trimethoxysilane, triethoxysilane, tripropoxysilane, tributoxysilane, alkoxytitanates, for example tetraalkoxytitanates such as tetramethoxytitanate, tetraethoxytitanate, tetrapropoxytitanate, tributoxytitanate, or, for example, trialkoxytitanates, such as trimethoxytitanate, triethoxytitanate, tripropoxytitanate, tributoxytitanate, alkoxyzirconates, for example tetraalkoxyzirconates such as tetramethoxyzirconate, tetraethoxyzirconate, tetrapropoxyzirconate, tetrabutoxyzirconate, or, for example, trialkoxyzirconates such as trimethoxyzirconate, triethoxyzirconate, tripropoxyzirconate, tributoxyzirconate, silica sols, amphiphilic substances, copper, graphite, ascorbyl palmitate, expanded natural graphite (ENG), silicon carbide, polysaccharides, fatty acids, alcyl silicon resins, metal-organic framework materials, where the metal-organic framework has a layer composition, or mixtures thereof.

Suitable binders are for example commercially available under trade names like Pural® SB (aluminum oxide), Ludox® AS 40 (colloidal silica), or Silres® MSE100 (methyl and methoxy groups containing polysiloxane).

Preferred binder, lubricants or additives are graphite, stearic acid, magnesium stearate, copper platelets, silicon carbide, expanded natural graphite (ENG), ascorbyl palmitate, polysaccharides, for example commercially available as Zusoplast PS1, aluminium oxide, for example commercially available as Pural SB or mixtures thereof.

In a preferred embodiment, the shaped body comprises at least 1% by weight of a binder and/or lubricant, which are selected from the group consisting of inorganic oxide, clay, concrete and graphite. Preferably the shaped body comprises less than 10% by weight of a binder and/or lubricant and most preferably, the shaped body comprises between 1.5% and 5% by weight of a binder and/or lubricant and most preferably between 2.5% and 3.5%. Alternatively, no binder or lubricant is used.

Further additives which can be used are, inter alia, amines or amine derivatives such as tetraalkylammonium compounds or amino alcohols and carbonate-comprising compounds, e.g. calcium carbonate. Such further additives are described, for instance, in EP 0 389 041 A1, EP 0 200 260 A1 or WO 95/19222. Further, pore-forming agents such as organic polymers, preferably methylcellulose, polyethylene oxide or mixtures thereof can be added. Preferably, the shaped body comprises from 1% to 50% by weight of further additives and more preferably from 3% to 20% by weight. Alternatively, no further additives are used.

In a further preferred embodiment, the gas stored in the storage vessel is selected from the group consisting of natural gas, shale gas, town gas, methane, ethane, hydrogen, propane, propene, ethylene, carbon dioxide and combinations thereof. In a particularly preferred embodiment, the stored gas comprises ethane and/or hydrogen to an extent of more than 70 vol.-%.

Further gases storable by means of the porous solid are acetylene, nitrogen oxides, oxygen, sulfur oxides, halogens, halogenated hydrocarbons, $NF_3$, $SF_6$, ammonia, hydrogen sulfide, ammonia, formaldehyde, noble gases, in particular helium, neon, argon, krypton and xenon.

For the purposes of the present invention, the terms "gas" is used in the interests of simplicity, but gas mixtures are likewise encompassed. The gas can also comprise small amounts of a liquid.

In a preferred embodiment, the storage vessel is mounted to a vehicle. The term "vehicle" includes but shall not be limited to cars, trucks, ships, airplanes, motorcycles, three-wheelers and the like.

The invention further relates to a shaped body for use in the storage vessel according to the invention. The shaped body is of a porous solid, the shaped body comprises an opening, the opening extending from a first end of the shaped body to an opposing second end of the shaped body, wherein the shaped body is formed in one piece and a shortest extension of the shaped body is in a range from 10 cm to 100 cm and a longest extension of the shaped body is in the range from 20 cm to 300 cm. Moreover, the invention relates to a use of the shaped body for storing gas. A process for storing gas can comprise the following steps: Feeding a gas into a storage vessel and contacting the gas with a shaped body according the invention, followed by absorption or adsorption of the gas by the shaped body.

Generally, processes for gas storage by means of shaped bodies are described in more detail for example in WO-A 2005/003622, WO-A 2003/064030, WO-A 2005/049484, WO-A 2006/089908 and DE-A 10 2005 012 087.

BRIEF DESCRIPTION OF THE DRAWINGS

The present invention is described in more detail at hand of the accompanying drawings in which:

FIG. 1 shows a storage vessel 1 according to the invention with a shaped body 3 arranged therein. The storage vessel 1 and the shaped body 3 are both of a cylindrical shape. At least 85% of an inner volume 13 of the storage vessel 1 is covered by the shaped body 3. In a section 7 of a wall 5 of the storage vessel 1 an inlet 9 is provided. In this illustrative example, the section 7 is an end face of the cylindrical storage vessel 1. A gas can enter the storage vessel 1 through the inlet 9 and further flow in parallel to a central axis 11 through an opening 19 of the shaped body 3.

Figure 1:
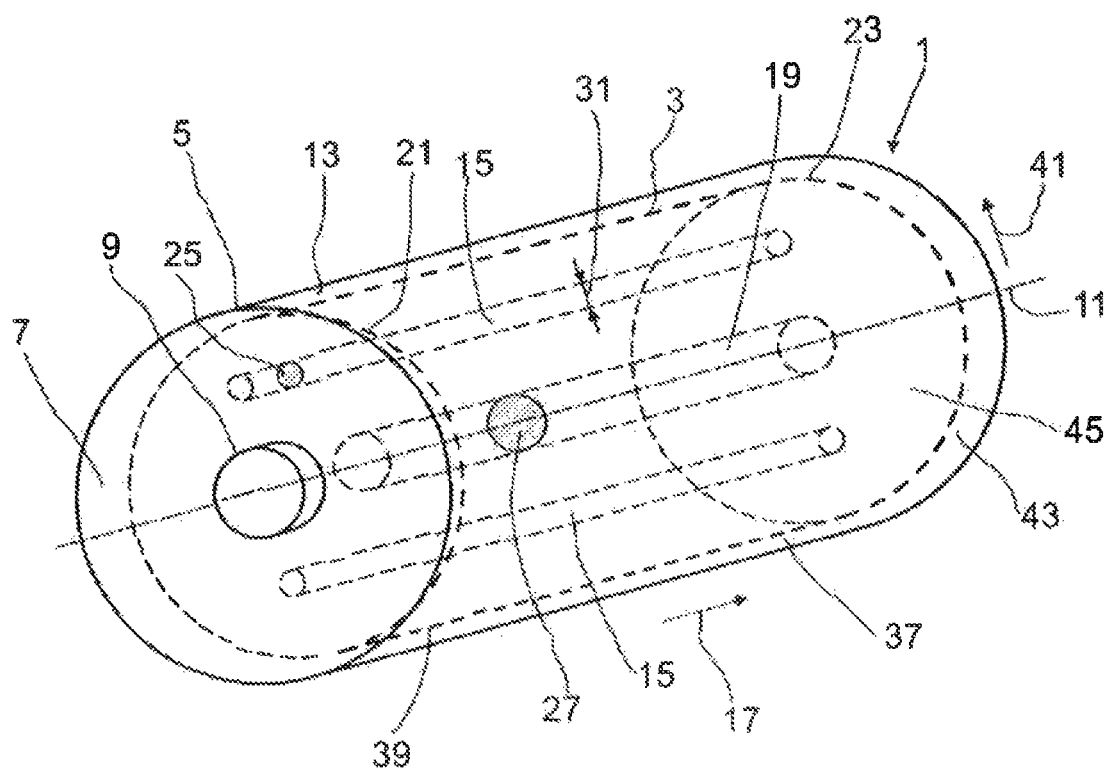
FIG. 1 shows a storage vessel with a shaped body according to the invention.

In order to give an orientation two directions are defined in a relation to the storage vessel 1. An axial direction 17 is parallel to the center axis 11 and a radial direction 41 is any rectangular direction referring to the central axis 11. The radial direction 41 is further parallel to a surface of a first end 21 and a surface of a second end 23 of the shaped body 3, which is opposing the first end 21. Here, the radial direction 41 is also parallel to the section 7 of the wall 5.

The opening 19 connects the first end 21 with the second end 23. Apart from the opening 19, the shaped body 3 is traversed by hollow channels 15, which are preferably parallel to the opening 19 and the central axis 11. Also the hollow channels 15 reach from the first end 21 to the second end 23. The hollow channels 15 comprise cross-sectional areas 25, which are smaller than a cross-sectional area 27 of the opening 19.

Between an end face 45 of the shaped body 3, which faces away from the inlet 9 at the wall 5 of the storage vessel 1 a first void space 43 is provided.

A peripheral surface 39, here corresponding to a cylindrical shell of the cylindrical shaped body 3, is curved and faces towards a curved part of the wall 5. Between the peripheral surface 39 and the wall 5 of the storage vessel 1 a second void space 37 is provided. Consequently, the peripheral surface 39 is in large parts not in direct contact to the wall 5.

Figure 2:
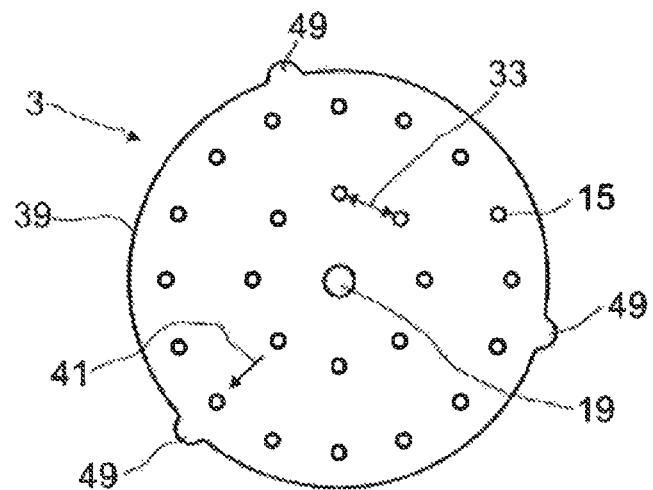
FIG. 2 shows a cross-sectional view of a shaped body according to the invention and FIG. 3 shows a longitudinal-sectional view of a storage vessel according to the invention.

FIG. 2 shows a cross-sectional view of a shaped body 3 according to the invention. The shaped body 3 provides an opening 19 in a central position. In addition to the opening 19, several hollow channels 15 are provided. The hollow channels 15 are distributed homogeneously over a cross-sectional area of the shaped body 3 and the hollow channels 15 are arranged in an equal distance 33 to each other. Further, three second spacers 49 are provided directly on a peripheral surface 39 of the shaped body 3 in order to generate a second void space 37 between the wall 5 of the storage vessel 1 and the peripheral surface 39 of the shaped body 3.

Figure 3:
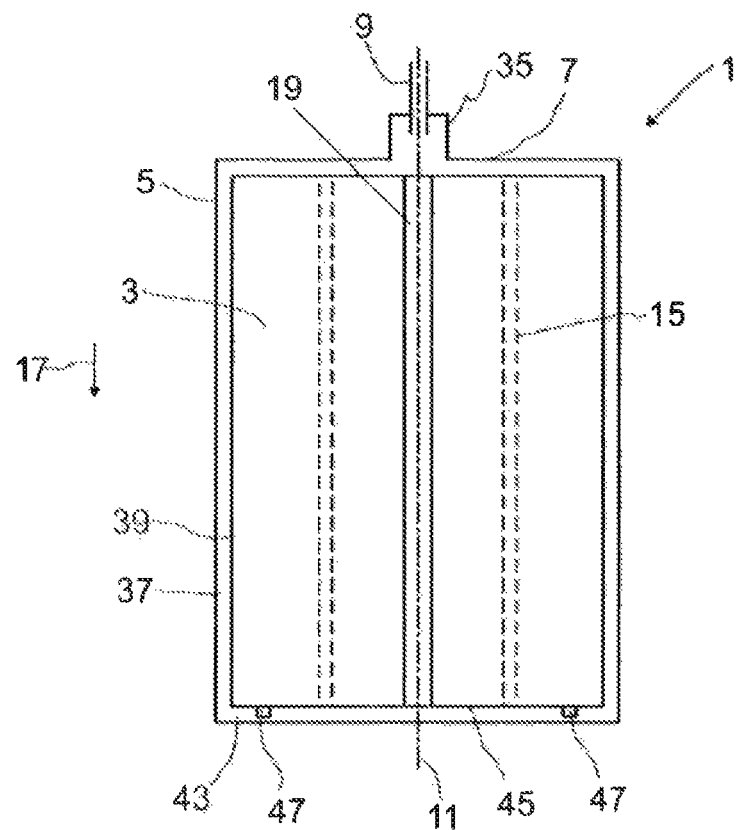

FIG. 3 shows a longitudinal cross-sectional view of a storage vessel 1 according to the invention. A shaped body 3, which is traversed by an opening 19 and several hollow channels 15, is arranged in the storage vessel 1. A section 7 of a wall 5 of the storage vessel 1 comprises an inlet 9 as well as an outlet 35. A gas can enter the storage vessel 1 through the inlet 9 and further flow through the opening 19 towards and end face 45 of the shaped body 3, which faces in axial direction 17 away from the inlet 9. From the opening 19 the gas enters a first void space 43, which is generated by first spacers 47, which are provided on the end face 45. In case of a filling process, wherein a flow-through is established, the gas can flow back from the first void space 43 to the outlet 35 either through the hollow channels 15 or a second void space 37 at a peripheral surface 39 of the shaped body 3. By the described gas flow heat, which is generated in the storage vessel 1 by for example adsorption of the gas onto the porous material of the shaped body 3, can be transferred from the center to the wall 5 of the storage vessel 1 and out of the storage vessel 1 through the outlet 34.

COMPARATIVE EXAMPLE

A cylindrical storage vessel possesses an inlet and an adjacent outlet. A longest extension of the cylindrical storage vessel, also referred to as length, is 1.5 m and an inner diameter is 0.5 m. Consequently, the total inner volume of the storage vessel accounts to 0.29 $m^3$. In the storage vessel a cylindrical shaped body is arranged. The shaped body is made of the MOF material Z377 and has a density of 500 g/L. A longest extension of the shaped body is 1.495 m, an outer radius of the shaped body is 0.25 m. Between the shaped body and the wall of the storage vessel a distance of 0.5 cm is provided at the side of the storage vessel, which opposes the inlet and the outlet.

The storage vessel is filled with natural gas to a maximum storage pressure of 250 bar within 20 minutes. During the filling process a flow-through regime is established, which is further described in WO 2014/057416. The pressure is raised from ambient pressure to 80 bar within 5 minutes. Then, the pressure of 80 bar is kept constant for 10 minutes and a flow-trough regime is established, leading gas into the storage vessel through the inlet and out of the storage vessel through the outlet simultaneously. Then, the pressure is further raised to 250 bar within 5 minutes.

Resulting storage capacities were determined by numerical simulation. 130 g gas per liter of the MOF material are storable in this storage vessel.

EXAMPLE 1

The storage vessel as described in the comparative example is applied. In contrast to the comparative example, the shaped body additionally provides an opening along the central axis with a radius of the opening of 3 cm.

The storage vessel is filled as described for the comparative example. Now, 200 g gas per liter of the MOF material are storable in the storage vessel.

EXAMPLE 2

The storage vessel as described in the comparative example is applied. In contrast to the comparative example, the shaped body additionally provides an opening along the central axis with a radius of the opening of 3 cm and the shaped body further provides approximately 700 bores, also referred to as hollow channels, in parallel to the opening. Each channel has a diameter of 2 mm and the channels are homogeneously distributed over the shaped body with a distance of 1 cm to each other.

The arrangement of this shaped body results in an empty volume, which is free of the shaped body, of 0.01 m$^3$. Referring to the total inner volume of the storage vessel, 97 vol.-% of the storage vessel are occupied by the shaped body and 3 vol.-% is free of porous solid.

The storage vessel is filled as described for the comparative example. Now, 270 g gas per liter of the MOF material are storable in the storage vessel.

REFERENCE NUMERALS 1 storage vessel
3 shaped body
5 wall
7 section
9 inlet
11 central axis
13 inner volume
15 hollow channel
17 axial direction
19 opening
21 first end
23 second end
25 cross-sectional area of the hollow channels
27 cross-sectional area of the opening
31 inner diameter
33 distance
35 outlet
37 second void space
39 peripheral surface
41 radial direction
43 first void space
45 end face
47 first spacer
49 second spacer

The invention claimed is:

1. A storage vessel (1) comprising a shaped body (3) of a porous solid, wherein the storage vessel (1) comprises a wall (5) with a section (7) comprising at least one inlet (9), wherein the storage vessel (1) has a central axis (11) and the central axis (11) is a longitudinal axis of the storage vessel (1) and/or perpendicular to a cross-sectional area of the at least one inlet (9), wherein the shaped body (3) covers at least 85% of an inner volume (13) of the storage vessel (1) and the shaped body (3) comprises an opening (19) in an axial direction (17), axial referring to the central axis (11) of the storage vessel (1), wherein the opening (19) extends from a first end (21) of the shaped body (3) to an opposing second end (23) of the shaped body (3) and wherein the storage vessel (1) comprises exactly one shaped body (3), which is formed in one piece, wherein the shaped body (3) comprises hollow channels (15) in the axial direction (17) and a cross-sectional area (25) of each hollow channel (15) is smaller than a cross-sectional area (27) of the opening (19).

2. The storage vessel according to claim 1, wherein the hollow channels (15) have an inner diameter (31) in a range from 0.5 mm to 3 mm.

3. The storage vessel according to claim 1, wherein a sum of the cross-sectional areas (25) of all hollow channels (15) is less than 20% smaller or greater than the cross-sectional area of the at least one inlet (9).

4. The storage vessel according to claim 1, wherein a shortest distance (33) between two circumferences of the cross-sectional areas (25) of adjacent hollow channels (15) is less than 2 cm.

5. The storage vessel according to claim 1, wherein the storage vessel (1) comprises at least one outlet (35), and the at least one inlet (9) and the at least one outlet (35) are both provided in the same section (7) of the wall (5) of the storage vessel (1).

6. The storage vessel according to claim 1, wherein a first void space (43), which is free of the shaped body (3), is provided between the wall (5) of the storage vessel (1) and an end face (45) of the shaped body (3), which faces in the axial direction (17) and which faces away from the at least one inlet (9), and wherein the first void space (43) comprises up to 15% of the inner volume (13) of the storage vessel (1).

7. The storage vessel according to claim 6, wherein at least one first spacer (47) is provided next to or on the end face (45) of the shaped body (3).

8. The storage vessel according to claim 1, wherein a second void space (37), which is free of the shaped body (3), is provided between the wall (5) of the storage vessel (1) and a peripheral surface (39) of the shaped body (3), wherein the peripheral surface (39) faces in a radial direction (41), radial referring to the central axis (11), and wherein the second void space (37) comprises up to 10% of the inner volume (13) of the storage vessel (1).

9. The storage vessel according to claim 8, wherein at least one second spacer (49) is provided next to or on the peripheral surface (39) of the shaped body (3).

10. The storage vessel according to claim 1, wherein the storage vessel (1) and the shaped body (3) have a cylindrical shape.

11. The storage vessel according to claim 1, wherein a shortest extension of the shaped body (3) is in a range from 10 cm to 100 cm and a longest extension of the shaped body (3) is in the range from 20 cm to 300 cm.

12. The storage vessel according to claim 1, wherein the porous solid is selected from the group consisting of activated charcoals, zeolites, activated aluminia, silica gels, open-pore polymer foams, metal hydrides, metal-organic frameworks (MOF) and combinations thereof and wherein the gas is selected from the group consisting of natural gas, shale gas, town gas, methane, ethane, hydrogen, propane, propene, ethylene, carbon dioxide and combinations thereof.

13. Shaped body for use in a storage vessel according to claim 1, wherein the shaped body is of a porous solid, the shaped body comprises an opening, the opening (19) extending from a first end (21) of the shaped body (3) to an opposing second end (23) of the shaped body (3), wherein the shaped body (3) is formed in one piece and wherein the shaped body (3) comprises hollow channels (15) in the axial direction (17) and a cross-sectional area (25) of each hollow channel (15) is smaller than a cross-sectional area (27) of the opening (19).

14. Method of storing a gas comprising the steps of inserting a gas into the shaped body of claim 13, and storing the gas in the shaped body.

* * * * *